(12) United States Patent
Chont

(10) Patent No.: US 6,401,441 B1
(45) Date of Patent: Jun. 11, 2002

(54) HARVESTING IMPLEMENT WITH CROP GUIDE ELEMENTS

(75) Inventor: Pascal Chont, Dijon (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/679,021

(22) Filed: Oct. 4, 2000

(30) Foreign Application Priority Data

Oct. 23, 1999 (DE) .......................................... 199 51 079

(51) Int. Cl.[7] .......................... A01D 43/10; A01D 57/26
(52) U.S. Cl. ...................................... 56/192; 56/16.4 A
(58) Field of Search ............................. 56/16.6, 16.4 A, 56/16.8, 192, 202, 203, 205, 206, 320.1, 320.2, DIG. 5

(56) References Cited

U.S. PATENT DOCUMENTS

| | | | | |
|---|---|---|---|---|
| 3,105,341 A | * | 10/1963 | De Murrel Crump | ......... 56/192 |
| 3,683,602 A | * | 8/1972 | Scarnato et al. | ............... 56/192 |
| 3,881,301 A | * | 5/1975 | Sawyer et al. | ................. 56/192 |
| 4,217,746 A | * | 8/1980 | Cicci et al. | ..................... 56/192 |
| 5,930,988 A | * | 8/1999 | Hanson | .................... 56/16.4 A |
| 5,966,913 A | * | 10/1999 | Neuerburg | ............... 56/16.4 A |

FOREIGN PATENT DOCUMENTS

| | | |
|---|---|---|
| CH | 688 568 | 11/1997 |
| DE | 36 04 691 A1 | 8/1987 |
| DE | 195 00 795 A1 | 3/1996 |
| EP | 0 139 821 B1 | 5/1984 |

* cited by examiner

*Primary Examiner*—Robert E. Pezzuto
*Assistant Examiner*—Nathan Mammen

(57) ABSTRACT

A mower-conditioner includes a crop guide arrangement for intercepting a stream of crop impelled to the rear by the mower and conditioner devices, where guide elements, in the form of vertical, triangular plates, may be selectively rotated down through slots provided in a crop guide surface so as to change the density and width of a swath of crop material deposited onto the ground behind the mower-conditioner.

10 Claims, 4 Drawing Sheets

HARVESTING IMPLEMENT WITH CROP GUIDE ELEMENTS

BACKGROUND OF THE INVENTION

CH-A5-688 568 discloses a crop treatment or conditioner implement for agricultural crops, both with and without a front-mounted mower. Downstream of the treatment device a hood is provided, which guides the mowed crop released from the treatment device downstream in order to discharge it appropriately onto the ground. On the bottom of the hood cover, several symmetrically arranged guide vanes are provided, which scatter the conditioned crop.

It is also known that a so-called swath plate can be mounted in the path of crop flow on the bottom of the hood cover at a site where the hood is wider than at its ordinary discharge end. In this manner a relatively wide swath can be formed.

The problem underlying the invention is seen in the fact that the guide vanes must be disassembled to use a swath plate and vice-versa.

SUMMARY OF THE INVENTION

According to the present invention, there is provided an improved crop guide arrangement for use with a crop mowing and/or conditioning implement.

An object of the invention is to provide a crop guide arrangement, for use with a crop mowing and/or conditioning implement, the guide arrangement including guide elements which may be easily selectively placed in the stream of crop created by the mowing and/or conditioning devices so as to alter the width or density of a swath of crop material deposited behind the implement.

A more specific object of the invention is to provide an implement, as set forth in the immediately preceding object, wherein the guide elements include a swath plate vertically pivotally mounted beneath the top of a hood of the implement, and a guide vane arrangement vertically pivotally mounted above the top of the hood, with the hood and guide vane including slits or slots vertically aligned with respective guide vanes so as to permit the vanes to be moved from a retracted position above the hood to a working position below the swath plate.

These and other objects will become apparent from a reading of the ensuing description together with the appended drawings.

DESCRIPTION OF THE PREFERRED EMBODIMENT

Figure 1:
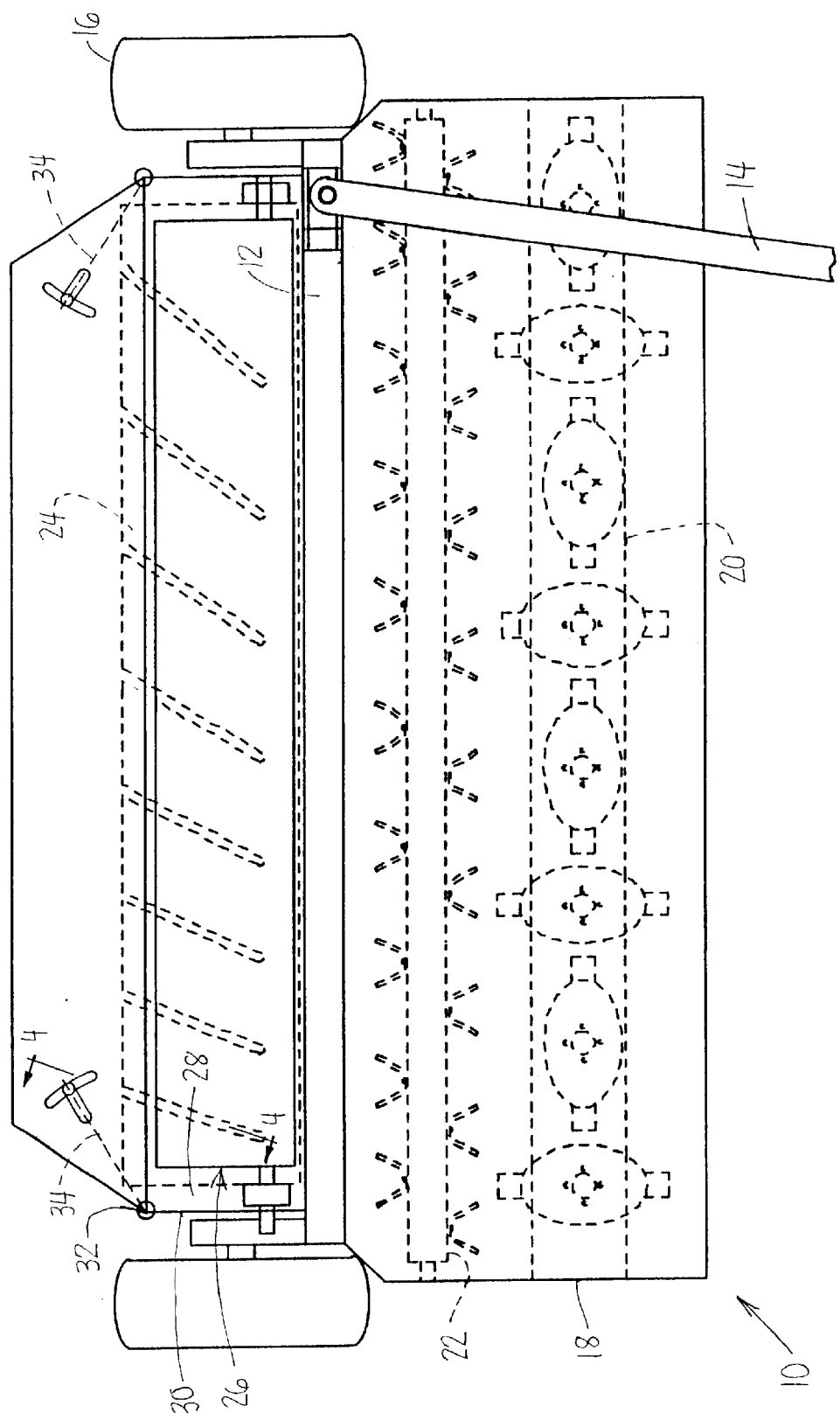
FIG. 1 is a top, somewhat schematic view of a mower-conditioner including a crop guide arrangement constructed in accordance with the present invention.

Referring now to FIG. 1, there is shown a harvesting implement 10 depicted as a mower-conditioner including a frame 12, a draft tongue 14, a pair of ground support wheels 16, a mower and conditioner housing 18, a crop mowing device 20, a crop conditioning device 22 and a crop guide arrangement including a guide surface or swath plate 24 and a guide vane device 26.

Although the harvesting implement 10 is designed in this practical example in the fashion of a mower-conditioner, this is not essential to the invention, and a design as a pure mower or as a pure conditioning or treatment implement is also possible instead. The harvesting implement 10 has the task of mowing and conditioning or treating the mowed crop and depositing the crop on the ground behind in a swath. It is desirable to be able to vary the width or location and density of the swath so that the swath lies more or less wide or offset or tight so that a subsequent harvesting machine, for example, a field chopper or a baler can pick up the harvested crop without problem.

Frame 12 is essentially designed as a bridge having an inverted U-shape and extends crosswise to the direction of travel in order to accommodate on each end one of the wheels 16 in a known vertically pivotable fashion using a vertically pivotable wheel support arm.

The draft tongue 14, in this practical example, extends forwardly from, and is connected to pivot horizontally on the left side of, the frame 12. The tongue 14 performs the usual function of connecting the harvesting implement 10 to a towing vehicle (not shown). The tongue 14 can also be connected on the right side or in the center of the frame 12.

The wheels 16 support the frame 12 on the ground through their respective support arms that are pivotally coupled to the corresponding vertical arms of the frame 12. Thus an intermediate space is formed between the wheels 16 in which the harvested crop can be discharged in a more or less broad swath.

The housing 18 is formed essentially box-like from sheet metal and mounted in the forward part thereof is the crop mowing device 20 followed by the crop conditioning device 22, the housing 18 forming a channel in whose interior the mowed crop is guided up to a discharge site behind and beneath the harvesting implement 10. While the housing 18 reaches at least the outer edges of the wheels 16 in a front region positioned on the bottom in FIG. 1, it is designed narrow in its rear region so that sufficient room is present in the intermediate space of frame 12. The housing 18 extends behind frame 12 and, depending on the version, also behind the wheels 16. In the rear region of housing 18, a cover 28 is provided, which grades into opposite side walls 30. On the rear edges of the side walls 30, side plates 34 are respectively connected by means of vertical pivot bearings 32, the side plates 34 acting for funneling the mowed crop laterally toward the center of the machine.

The crop mowing device 20 in this practical example is designed as a rotary disk mower. As an alternative, a drum design, a sickle bar, or the like, could also be used. The mowing device 20 serves to separate standing crop from the ground and convey it rearward to be deposited on the ground. Instead of the mowing device 20, a crop conditioning rotor could be used to pick up already mowed crop, condition the crop and then release it rearward to be deposited on the ground.

The crop conditioning device 22 is as wide as or narrower than the crop mowing device 20 and conditions the crop so that it dries more quickly and then conveys the conditioned crop to the guide surface 24. The crop conditioning device 22 can be designed as a tined rotor, as a brush rotor, as a double roll or the like.

Figure 2:
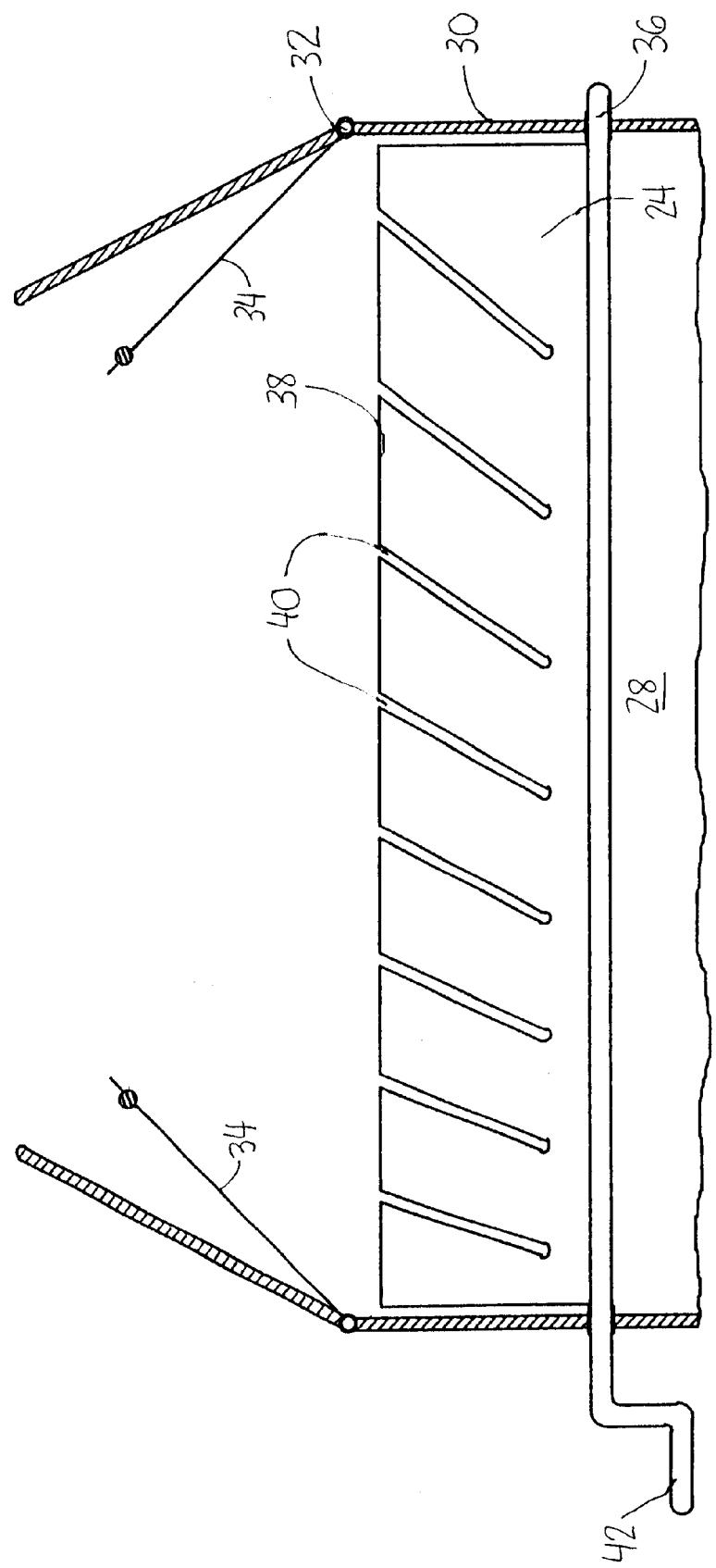
FIG. 2 is a horizontal sectional view, of the crop guide arrangement shown in FIG. 1, with parts being omitted for simplicity.
Figure 3:
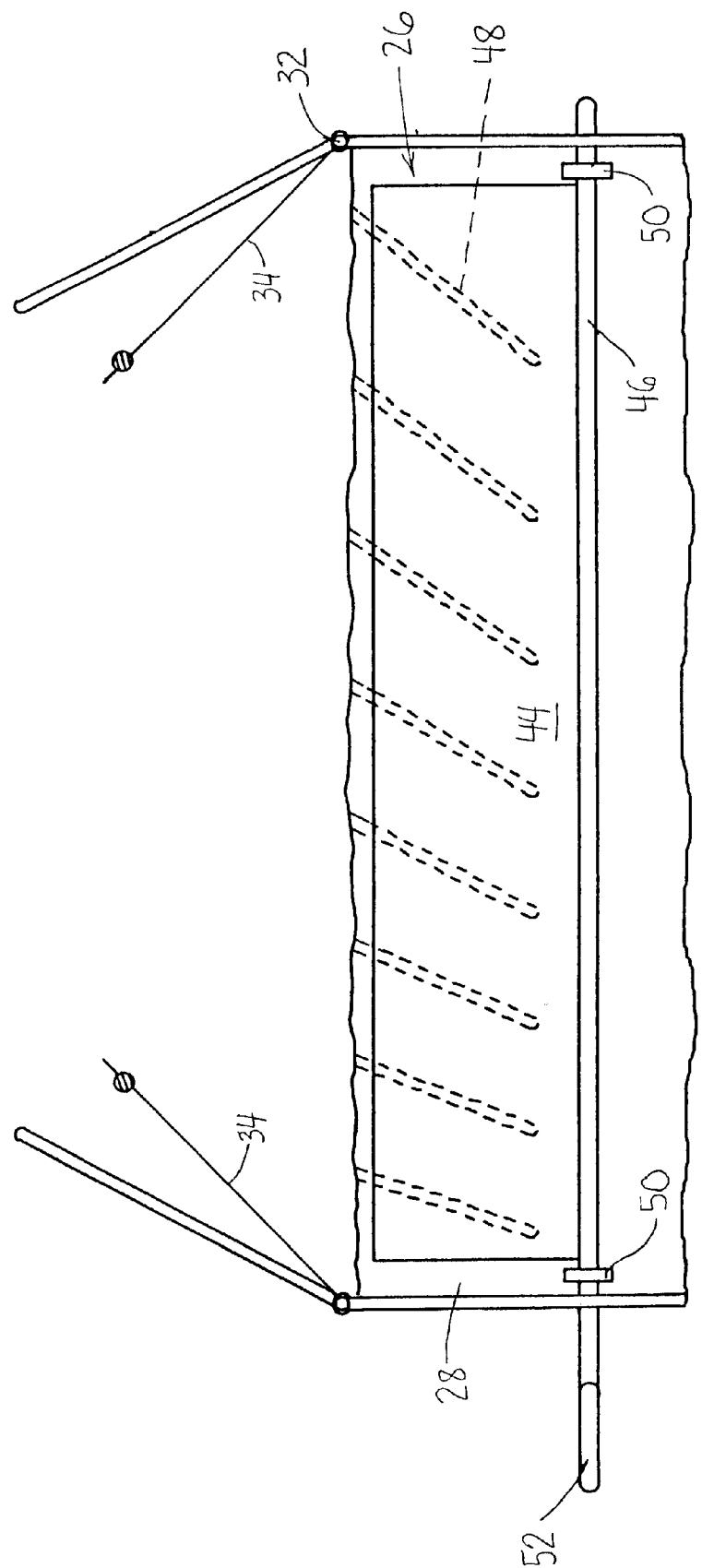
FIG. 3 is a top plan view, of the crop guide arrangement shown in FIG. 1, but omitting the swath plate and adjustable side plates, with the housing top broken away, the plate carrying the guide vanes being shown in a lowered working position wherein the vanes extend through respective vertically aligned openings provided in the top of the hood.

The guide surface 24, in this case, is formed from a so-called swath plate, which is situated in the housing 18 beneath cover 28 and can be moved by means of a shaft 36 (see FIGS. 2 and 4) more or less directly or indirectly into the crop stream coming from the crop conditioning device 22. Generally, any surface on which the harvested crop passes along after leaving the crop conditioning device 20 can be considered as forming the guide surface 24.

The guide surface 24 is designed essentially rectangular and is rigidly connected to the shaft 36. The shaft 36 is mounted in bearings (not further shown) to pivot in the side walls 30 and is connected to a long edge of the guide surface 24. Openings 40, in the form of slits, extend in the direction of shaft 36 from a rear end edge 38 located on the opposite side of the guide surface 24 from the shaft 36.

The openings 40 are open in the region of end edge 38 and run sloping, here shown angled to the right from rear to front, relative to the longitudinal center axis of the harvesting implement 10. The slope of openings 40 is chosen so that they diverge slightly from each other from the front to the rear. The openings 40 extend over a significant part of the guide surface 24. As an alternative (not shown), the openings can also extend parallel to each other or diverge in the fashion of a "V".

The openings 40, in a version not shown, can also be closed on the end, which is conceivable in an arrangement designed such that the harvested crop does not become caught and held in the openings 40.

The shaft 36 is provided on one end with a crank arm 42, with which the position of the guide surface 24 can be changed manually. The position can also be secured by locking devices (not shown), like cranks, locks, brakes or the like. Depending on the position of guide surface 24, the crop stream is more or less strongly deflected downward and forms a wide swath. Without using the guide surface 24 the crop stream would be forced together by the side sheets 34 across the direction of crop flow.

The guide device 26 includes a support plate 44, a shaft 46 and guide elements 48.

The support plate 44 is designed rectangular, roughly of the same size as the guide surface 24, and has a long, front side fixed to the shaft so that the plate 44 rotates in unison with the shaft 46. Alternatively, the support plate 44 can be mounted on the top of cover 28. Instead of support plate 44, another structure could also be used, for example, a frame, rail or the like, as long as the purpose, namely connecting the guide elements 48 to each other, is achieved.

The shaft 46 is longer than support plate 44 and has opposite end portions respectively mounted to rotate in brackets 50 fixed to the top of the cover 28. On one end of the shaft 46, there is provided an integral crank arm 52 with which shaft 46 can be pivoted. In the same manner as with crank arm 42, the crank arm 52 can also be secured in any position with any well known device. As an alternative, the crank arm 52, like crank arm 42, can be adjusted by an operating device, for example, in the form of a motor, a linkage or cable pull.

The guide elements 48 correspond in number, position and alignment to those of openings 40. When the guide elements 48 are narrower than the openings 40, they can also assume a position deviating from alignment of the openings. Like the openings 40, the guide elements 48 can also run parallel to each other or diverge relative to a center plane. Whereas in the first case only lateral offset of the crop stream occurs, a "V"-shaped arrangement leads to wide scattering of the crop stream. However, generally a lateral offset of the crop stream and broad scattering is preferred, which leads to a swath whose width maximally corresponds to the harvesting width. The guide elements 48 are designed according to FIG. 4, in the side view, essentially triangular, in which one side is attached to 35 the support plate 44, one side runs perpendicular to the first side on the downstream end and a hypotenuse extends from the upstream end to the downstream end and thus has a slope toward the ground in the operating condition according to FIG. 4. The guide elements 48 are formed from a plate and are suitable for taking up significant lateral forces.

Figure 4:
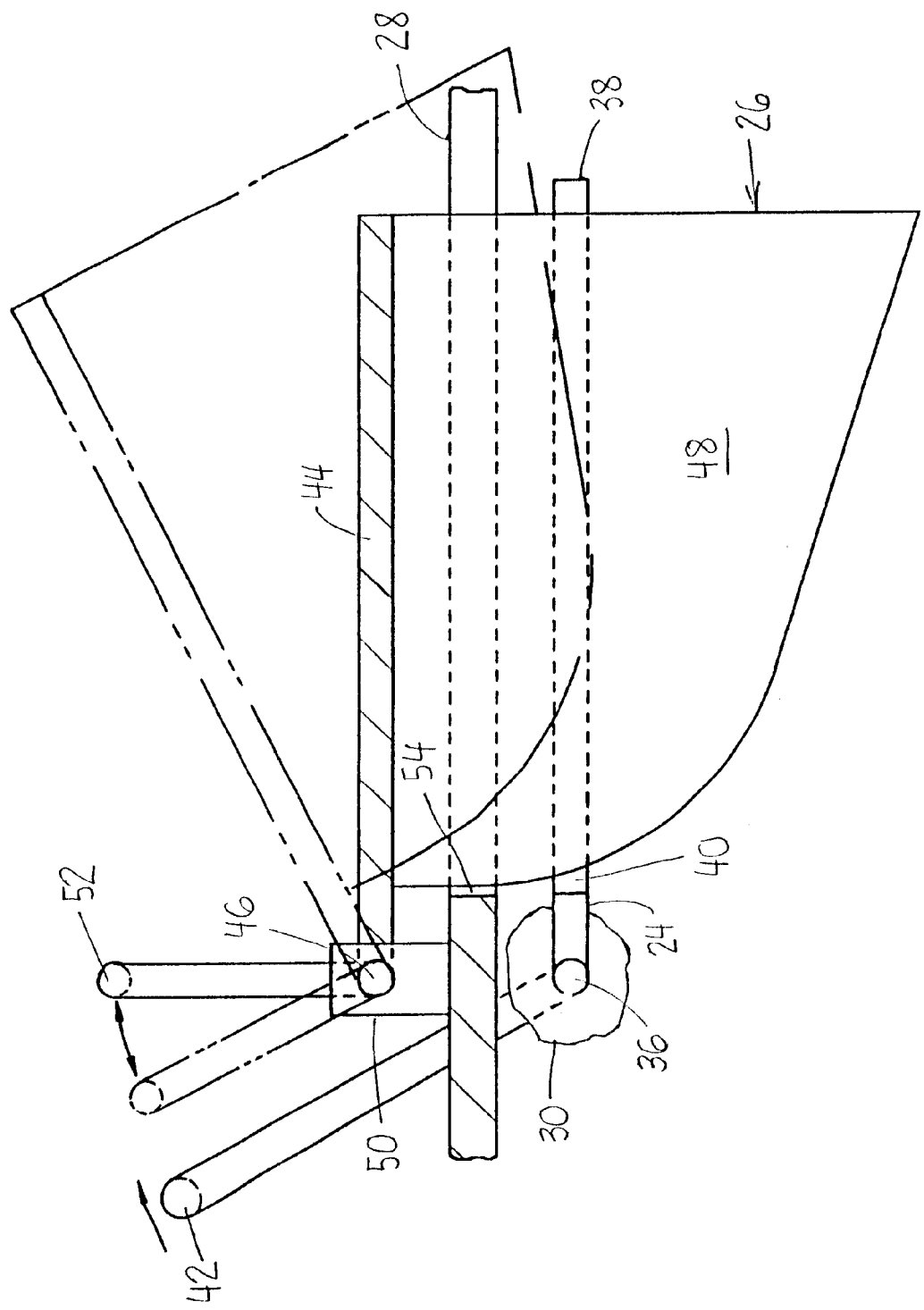
FIG. 4 is an enlarged vertical sectional view taken through the crop guide arrangement of FIG. 1, at line 4—4, showing the swath plate and the plate carrying the guide vanes.

FIG. 4 shows the assembly of the housing 18, guide surface 24 and guide device 26 in a vertical section. According to FIG. 4, the support plate 44 is situated above the cover 28 so that openings 54 are present in the form of slits congruent with the openings 40 in the cover 28, through which the guide elements 48 can extend. Alternatively, in a version (not shown), the support plate 44 could be accommodated in a cutout in the cover 28. In the depicted version, the guide surface 24 is situated in an upper position in which it does not extend into the crop stream. As a result, the crop stream reaches the region between guide elements 48 and is then scattered or deflected broadly.

If broad scattering or lateral deflection is not desired, the guide device 26 is pivoted counterclockwise upward so as to be out from the inner region of housing 18 and thus becomes inactive. In this case, the crop stream slides on the bottom of cover 28 and along the bottom of guide surface 24 until it contacts side plates 34, if they are present. After contact with side plates 34, a narrow swath is produced.

If a wide swath is to be formed, the guide surface 24 is pivoted downward clockwise and the crop stream impinges on it in order to fall on the ground in a wide swath. It is not essential that the guide device 26 be brought into the position of FIG. 4 where it is depicted with the dashed line.

According to all this, the harvested product can be deposited according to the invention in several ways, for example, narrow swath, wide swath or broadly scattered on the ground, without having to refit the harvesting implement 10. In addition, by the degree of penetration of the guide elements 48 into the internal space of the housing 18, the intensity of the effect on the crop stream can be varied.

In the present practical example, the position of the guide elements 48 on support plate 44 is fixed. However, it is also possible to mount the guide elements 48 on one end or in the center to pivot around an axis perpendicular to the support plate 44. In this case, the guide elements 48 must maintain a spacing with their upper edge relative to the support plate 44 which corresponds at least to the thickness of the cover 28 and the guide surface 24. Moreover, it must be guaranteed that the guide elements 48 have the alignment of openings 40 and 54, when the guide device 26 is pivoted vertically. By virtue of this pivoting capability of the guide elements 48, both the discharge direction and the scattering width or swath width can be varied.

What is claimed is:

1. In a harvesting implement having a crop engaging device for causing a rearward stream of crop material flowing parallel to a longitudinal vertical plane, and an upper guiding surface and a crop guide device having at least one guide element, each guiding said stream of crop material at a location downstream from said crop engaging device, the improvement comprising: a swath plate extending transverse to said stream of crop material and having a lower surface defining said guiding surface; said swath plate being provided with at least one narrow, generally fore-and-aft extending opening; said guide device including at least one substantially vertical, vane-like guide element mounted for vertical movement among a raised, non-operating position, wherein a lower edge of said guide element is substantially even with said guiding surface, and a range of lowered working positions, wherein said guide element extends different distances into a zone below said guiding surface.

2. The harvesting implement defined in claim 1 wherein said crop engaging device is enclosed in a housing having an upper portion defining a cover; and said swath plate being located beneath said cover of said housing.

3. The harvesting Implement defined in claim 1 wherein said swath plate is mounted, at a front edge thereof, for pivoting vertically about a horizontal, transverse axis among a raised position, wherein said guiding surface is substantially horizontal, and selected lowered positions inclined downwardly from front to rear at various degrees into said stream of crop.

4. The harvesting implement defined in claim 1 wherein said crop engaging device is enclosed in a housing; said housing having a cover including a substantially planar section extending to the rear from said crop engaging device above said swath plate and being provided with an elongate opening located in vertical alignment with the elongate opening in said swath plate; and said guide device being mounted above said cover with said guide element extending through said elongate opening in said cover.

5. The harvesting implement defined in claim 1 wherein said guide device comprises multiple, transversely spaced, guide elements which are connected to each other; said swath plate being provided with a plurality of transversely spaced, generally fore-and-aft extending, elongate narrow openings located for respectively receiving said guide elements; and an adjustment device being connected to said guide elements for effecting vertical adjustment of said guide elements.

6. The harvesting implement defined in claim 5 wherein said guide device includes a pivot shaft journalled for pivoting about a horizontal axis.

7. The harvesting implement defined in claim 1 wherein said opening terminates at a rear edge of said guiding surface.

8. The harvesting implement defined in claim 1 wherein said substantially vertical, vane-like guide element is disposed at an angle to said vertical longitudinal plane, and hence to said stream of crop.

9. The harvesting implement defined in claim 1 wherein said crop engaging device is one of a mowing device or crop conditioning device.

10. The harvesting implement defined in claim 9 wherein said crop engaging device is a mowing device and is followed by a crop conditioning device; and said guiding surface and guiding device following said crop conditioning device.

* * * * *

UNITED STATES PATENT AND TRADEMARK OFFICE
CERTIFICATE OF CORRECTION

PATENT NO.    : 6,401,441 B1                                             Page 1 of 1
DATED         : June 11, 2002
INVENTOR(S)   : Pascal Chont It is certified that error appears in the above-identified patent and that said Letters Patent is hereby corrected as shown below:

<u>Column 5,</u>
Line 12, "Implement" should be replaced with -- implement --.

Signed and Sealed this

Eighteenth Day of November, 2003

JAMES E. ROGAN
*Director of the United States Patent and Trademark Office*